United States Patent
Nakamura et al.

(10) Patent No.: US 10,816,699 B2
(45) Date of Patent: Oct. 27, 2020

(54) FUNCTIONAL SHEET INCLUDING POLYESTER RESIN, AND LENS USING FUNCTIONAL SHEET

(71) Applicants: MITSUBISHI GAS CHEMICAL COMPANY, INC., Tokyo (JP); MGC FILSHEET CO., LTD., Saitama (JP)

(72) Inventors: Kyousuke Nakamura, Saitama (JP); Takuya Gotou, Tokyo (JP); Hirotaka Tsuruya, Kanagawa (JP); Kazuhisa Mitsuhata, Saitama (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 113 days.

(21) Appl. No.: 15/528,899

(22) PCT Filed: Dec. 1, 2015

(86) PCT No.: PCT/JP2015/083704
§ 371 (c)(1),
(2) Date: May 23, 2017

(87) PCT Pub. No.: WO2016/088740
PCT Pub. Date: Jun. 9, 2016

(65) Prior Publication Data
US 2017/0329054 A1 Nov. 16, 2017

(30) Foreign Application Priority Data
Dec. 4, 2014 (JP) .................................. 2014-245903

(51) Int. Cl.
*G02B 1/14* (2015.01)
*G02C 7/12* (2006.01)
(Continued)

(52) U.S. Cl.
CPC ................ *G02B 1/14* (2015.01); *B29C 45/14* (2013.01); *B29C 48/18* (2019.02); *B29D 11/00009* (2013.01); *B29D 11/00644* (2013.01); *B29D 11/00653* (2013.01); *B29D 11/00865* (2013.01); *B32B 7/02* (2013.01); *B32B 27/36* (2013.01); *G02B 1/04* (2013.01); *G02B 1/041* (2013.01); *G02B 5/30* (2013.01); *G02C 7/108* (2013.01); *G02C 7/12* (2013.01); *B29D 11/00* (2013.01); *B29D 11/00634* (2013.01); *B29K 2067/00* (2013.01); *B29K 2069/00* (2013.01); *B29K 2105/0088* (2013.01); *B29K 2105/20* (2013.01); *B29K 2667/00* (2013.01); *B29K 2669/00* (2013.01); *B29K 2995/002* (2013.01); *B29K 2995/0018* (2013.01); *B29K 2995/0026* (2013.01); *B29K 2995/0034* (2013.01); *B32B 27/08* (2013.01); *B32B 27/18* (2013.01); *B32B 27/20* (2013.01); *B32B 27/365* (2013.01); *B32B 37/04* (2013.01); *B32B 37/15* (2013.01); *B32B 38/0012* (2013.01); *B32B 2250/03* (2013.01); *B32B 2250/244* (2013.01); *B32B 2250/40* (2013.01); *B32B 2307/40* (2013.01); *B32B 2307/402* (2013.01); *B32B 2307/4026* (2013.01); *B32B 2307/412* (2013.01); *B32B 2307/42* (2013.01); *B32B 2367/00* (2013.01); *B32B 2369/00* (2013.01); *B32B 2551/00* (2013.01); *C08G 63/137* (2013.01); *C08G 63/199* (2013.01); *C08L 67/00* (2013.01); *C08L 67/02* (2013.01); *C08L 69/00* (2013.01); *G02B 1/08* (2013.01); *G02C 7/10* (2013.01); *G02C 7/102* (2013.01); *Y10T 428/31504* (2015.04);
(Continued)

(58) Field of Classification Search
None
See application file for complete search history.

(56) References Cited

U.S. PATENT DOCUMENTS 3,900,672 A * 8/1975 Hammond ........... C09D 133/02
428/334
5,702,813 A 12/1997 Murata et al.
(Continued)

FOREIGN PATENT DOCUMENTS

CN     202631774          12/2012
CN     202631774 U  *    12/2012
(Continued)

OTHER PUBLICATIONS

International Search Report issued in Patent Application No. PCT/JP2015/083704, dated Mar. 1, 2016.

*Primary Examiner* — Vivian Chen
(74) *Attorney, Agent, or Firm* — Greenblum & Bernstein, P.L.C.

(57) ABSTRACT

The present invention provides a functional sheet including a functional layer provided between protective layers. The functional layer is a polarizing film layer, a photochromic layer, or a combination of the polarizing film layer and the photochromic layer. At least one of the protective layers includes a layer formed of a resin (C) containing a polyester resin (A) obtained as a result of polycondensation of 1,4-cyclohexanedimethanol and 1,4-cyclohexanedicarboxylic acid and an aromatic polycarbonate resin (B), the polyester resin (A) being contained at a content of 10 to 100 parts by mass and the aromatic polycarbonate resin (B) being contained at a content of 0 to 90 parts by mass with respect to 100 parts by mass as a total of the polyester resin (A) and the aromatic polycarbonate resin (B). A lens is provided with such a functional sheet.

6 Claims, No Drawings

(51) Int. Cl.

| | | |
|---|---|---|
| B32B 27/36 | (2006.01) | |
| G02B 5/30 | (2006.01) | |
| B29C 45/14 | (2006.01) | |
| G02B 1/04 | (2006.01) | |
| B32B 7/02 | (2019.01) | |
| B29C 48/18 | (2019.01) | |
| B29D 11/00 | (2006.01) | |
| G02C 7/10 | (2006.01) | |
| B32B 27/18 | (2006.01) | |
| B32B 27/20 | (2006.01) | |
| B32B 37/04 | (2006.01) | |
| B32B 27/08 | (2006.01) | |
| B32B 38/00 | (2006.01) | |
| B32B 37/15 | (2006.01) | |
| B29K 669/00 | (2006.01) | |
| B29K 667/00 | (2006.01) | |
| B29K 105/00 | (2006.01) | |
| C08L 67/00 | (2006.01) | |
| C08L 69/00 | (2006.01) | |
| G02B 1/08 | (2006.01) | |
| C08L 67/02 | (2006.01) | |
| C08G 63/137 | (2006.01) | |
| C08G 63/199 | (2006.01) | |
| B29K 67/00 | (2006.01) | |
| B29K 69/00 | (2006.01) | |
| B29K 105/20 | (2006.01) | |

(52) U.S. Cl.
CPC ............... Y10T 428/31786 (2015.04); Y10T 428/31797 (2015.04)

(56) References Cited

U.S. PATENT DOCUMENTS

| | | | | | |
|---|---|---|---|---|---|
| 6,117,923 | A * | 9/2000 | Amagai | ............... | C08G 59/302 523/440 |
| 6,136,441 | A * | 10/2000 | MacGregor | ............. | B32B 27/36 428/412 |
| 6,221,556 | B1 * | 4/2001 | Gallucci | ................ | C08L 67/02 428/64.7 |
| 6,328,446 | B1 * | 12/2001 | Bhalakia | ........... | B29C 45/14811 351/159.62 |
| 6,458,913 | B1 * | 10/2002 | Honigfort | ........... | B29C 45/0001 264/176.1 |
| 6,465,102 | B1 * | 10/2002 | Honigfort | ........... | B29C 45/0001 428/412 |
| 7,067,186 | B2 * | 6/2006 | Oguro | ..................... | C08L 67/02 428/220 |
| 7,597,441 | B1 * | 10/2009 | Farwig | ................... | G02B 5/208 351/159.65 |
| 7,781,540 | B2 * | 8/2010 | Yanagida | ............... | C08L 67/025 525/466 |
| 8,222,347 | B2 * | 7/2012 | Chakravarti | ............ | C08L 67/02 525/418 |
| 9,296,146 | B1 * | 3/2016 | Thielman | ................. | B29C 43/24 |
| 9,606,373 | B2 * | 3/2017 | Tokumaru | ................. | G02C 7/10 |
| 9,784,895 | B2 * | 10/2017 | Kimura | .................. | G02B 5/223 |
| 9,977,264 | B2 * | 5/2018 | Kimura | .................. | G02C 7/12 |
| 10,689,486 | B2 * | 6/2020 | Kato | ............... | C08G 63/193 |
| 2002/0111428 | A1 * | 8/2002 | Gaggar | ................... | C08L 67/02 525/67 |
| 2003/0030172 | A1 * | 2/2003 | Hoogland | ......... | B29C 45/14688 264/161 |
| 2003/0032725 | A1 * | 2/2003 | Gaggar | ................... | C08L 67/02 525/67 |
| 2003/0105276 | A1 * | 6/2003 | Tadros | .................... | B32B 27/08 528/480 |
| 2003/0124358 | A1 * | 7/2003 | Vollenberg | .............. | B32B 27/34 428/423.5 |
| 2003/0149190 | A1 * | 8/2003 | Duan | ..................... | C08L 67/02 525/439 |
| 2004/0028908 | A1 * | 2/2004 | Vollenberg | .............. | B32B 27/36 428/412 |
| 2004/0097662 | A1 * | 5/2004 | Gaggar | ................... | C08L 67/02 525/469 |
| 2004/0220333 | A1 * | 11/2004 | Tadros | .................. | B29C 43/222 525/55 |
| 2005/0113533 | A1 * | 5/2005 | Shaikh | .................... | C08L 67/02 525/439 |
| 2005/0197484 | A1 * | 9/2005 | Tanaka | .................... | C08L 67/02 528/194 |
| 2005/0215677 | A1 * | 9/2005 | Gaggar | ................... | C08L 67/02 524/115 |
| 2005/0243274 | A1 * | 11/2005 | Chou | .................. | B29D 11/0073 351/159.56 |
| 2006/0020075 | A1 * | 1/2006 | Basham | ...................... | C08J 5/18 524/494 |
| 2006/0135690 | A1 * | 6/2006 | Juikar | .................. | C08G 77/448 525/67 |
| 2007/0032607 | A1 * | 2/2007 | Fuji | ....................... | C08L 67/025 525/439 |
| 2007/0155914 | A1 * | 7/2007 | Chen | .................... | C08L 69/00 525/461 |
| 2008/0020209 | A1 * | 1/2008 | Chen | .................. | B29D 11/0073 428/412 |
| 2009/0030128 | A1 * | 1/2009 | Chakravarti | ............ | C08L 67/02 524/413 |
| 2009/0030129 | A1 * | 1/2009 | Chakravarti | ............ | C08L 67/02 524/413 |
| 2009/0191403 | A1 * | 7/2009 | Tripathi | ................... | B32B 27/08 428/332 |
| 2009/0191411 | A1 * | 7/2009 | Tripathi | ................... | B32B 27/36 428/412 |
| 2009/0215933 | A1 * | 8/2009 | Kasai | ................... | C08G 63/199 524/115 |
| 2009/0286062 | A1 * | 11/2009 | Vaze | ....................... | C08L 67/02 428/220 |
| 2009/0326110 | A1 * | 12/2009 | Tanaka | ..................... | C08K 5/49 524/127 |
| 2010/0010141 | A1 * | 1/2010 | Nakamura | ............... | C08L 67/02 524/451 |
| 2010/0014144 | A1 * | 1/2010 | Ota | ........................ | G02B 1/041 359/241 |
| 2010/0182701 | A1 * | 7/2010 | Wu | ......................... | G02B 1/105 359/614 |
| 2011/0071261 | A1 * | 3/2011 | Hoeks | ..................... | C08G 63/64 525/418 |
| 2011/0086951 | A1 * | 4/2011 | Gaggar | .................... | C08L 67/02 524/82 |
| 2011/0155975 | A1 * | 6/2011 | Chakravarti | ................ | C08J 5/18 252/589 |
| 2011/0189449 | A1 * | 8/2011 | Tripathi | .................. | B32B 27/08 428/213 |
| 2011/0201762 | A1 * | 8/2011 | Kato | ................ | C08G 64/0208 525/462 |
| 2012/0218511 | A1 * | 8/2012 | Bhalakia | ............... | B29D 11/00028 351/159.56 |
| 2012/0231255 | A1 * | 9/2012 | Tanaka | ........................ | C08J 5/18 428/220 |
| 2013/0329184 | A1 * | 12/2013 | Barzak | .................... | G02C 7/102 351/159.56 |
| 2014/0125947 | A1 * | 5/2014 | Imizu | ...................... | G02B 1/10 351/159.61 |
| 2014/0232983 | A1 * | 8/2014 | Tokumaru | ................ | G02C 7/10 351/159.56 |
| 2015/0205011 | A1 * | 7/2015 | Gotou | .................... | C08G 64/06 351/49 |
| 2015/0234210 | A1 * | 8/2015 | Kimura | ................ | B32B 27/306 351/159.56 |
| 2015/0248023 | A1 * | 9/2015 | Kimura | ............... | G02B 5/3033 351/49 |
| 2015/0355395 | A1 | 12/2015 | Kimura et al. | | |
| 2016/0017218 | A1 * | 1/2016 | Kojima | .................... | G02B 1/10 359/355 |

(56) References Cited

U.S. PATENT DOCUMENTS

| | | | |
|---|---|---|---|
| 2016/0216407 A1* | 7/2016 | Kojima | C08K 5/0091 |
| 2016/0223839 A1* | 8/2016 | Kakinuma | G02C 7/104 |
| 2017/0009073 A1* | 1/2017 | Wen | C08L 67/02 |

FOREIGN PATENT DOCUMENTS

| | | | |
|---|---|---|---|
| EP | 0 899 302 A * | 3/1999 | |
| EP | 1 318 416 A * | 6/2003 | |
| EP | 1 903 067 A * | 3/2008 | |
| JP | 03-039903 | 2/1991 | |
| JP | 08-052817 | 2/1996 | |
| JP | 08-0313701 | 11/1996 | |
| JP | 08-313701 A * | 11/1996 | |
| JP | 09-183896 A * | 7/1997 | |
| JP | 2003-073559 A * | 3/2003 | |
| JP | 2003-073564 A * | 3/2003 | |
| JP | 2004-210889 | 7/2004 | |
| JP | 2004-210889 A * | 7/2004 | |
| JP | 2005-165085 | 6/2005 | |
| JP | 2005-165085 A * | 6/2005 | |
| JP | 2007-138139 A * | 6/2007 | |
| JP | 2010-039357 | 2/2010 | |
| JP | 2010-039357 A * | 2/2010 | |
| JP | 2011-132422 | 7/2011 | |
| TW | 201423203 | 6/2014 | |
| WO | WO 99/48685 A * | 9/1999 | |
| WO | WO 99/63002 A * | 12/1999 | |
| WO | 2014/030603 | 2/2014 | |
| WO | 2014/030611 | 2/2014 | |
| WO | 2014/115705 | 7/2014 | |

\* cited by examiner

FUNCTIONAL SHEET INCLUDING POLYESTER RESIN, AND LENS USING FUNCTIONAL SHEET

TECHNICAL FIELD

The present invention relates to a functional sheet having a polarizing function or photochromic function, and also an eyewear item obtained as a result of such a functional sheet being bent into a curved shape or an injection-molded eyewear item obtained as a result of, after the bending, a transparent resin for a lens being injection-molded to be put on one of surfaces of the functional sheet, specifically to a colored eyewear item obtained as a result of dyeing.

BACKGROUND ART

An aromatic polycarbonate sheet has high transparency, high impact resistance, and high heat resistance and is lightweight, and therefore, is used for liquid crystal displays, windows of buildings, sunroofs of automobiles, and sunglasses and goggles used for marine sports, winter sports, fishing and the like.

However, an aromatic polycarbonate sheet has a high photoelastic constant, and therefore, easily causes colored interference fringes by retardation when being bent into a spherical or aspherical planar shape in order to produce sunglasses or goggles. Such colored interference fringes have problems of, for example, spoiling the external appearance and causing asthenopia.

One known measure against the retardation caused by the bending is to use an aromatic polycarbonate polarizing sheet produced by rolling an aromatic polycarbonate sheet used for a protective layer in advance to cause a large value of retardation, so that the colored interference fringes are invisible (hereinafter, such an aromatic polycarbonate polarizing sheet will be referred to as a "stretched polycarbonate polarizing sheet) (Patent Document 1). Such a stretched polycarbonate polarizing sheet is used for products, among various polarizing lenses, having a splendid external appearance or significantly suppressing asthenopia.

Another known polarizing lens is provided for the purpose of improving the impact resistance more than the above-described polarizing lens formed by bending the stretched polycarbonate polarizing sheet or for the purpose of providing a correction lens having a focal power. Such a polarizing lens is produced as follows. A stretched polycarbonate polarizing sheet that is bent so as to have a spherical or aspherical planar shape is inserted into a mold and aromatic polycarbonate is injection-molded to be put on the stretched polycarbonate polarizing sheet (Patent Documents 2 and 3).

Still another polarizing lens that is proposed uses a polymer alloy formed of a polyester resin containing 1,4-cyclohexanedimethanol component and a dicarboxylic acid component and aromatic polycarbonate (Patent Document 4). Such a polyester resin is used as a transparent resin material that is strongly integrated, as a result of melting, with the aromatic polycarbonate resin injected by insert mold injection molding, without spoiling the high heat resistance or the high impact resistance of the aromatic carbonate resin.

A surface of a lens formed as described above is, for example, hard-coated or provided with an anti-reflection layer optionally, and then is secured to a frame by edging, drilling, screw tightening and the like. Thus, sunglasses or goggles are produced.

A molded body of a transparent resin used for eyeglass lenses and the like, which need to be highly fashionable, is required to have high characteristics such as high optical characteristics (e.g., high transparency, high refractive index, etc.), high impact resistance and the like, and is also strongly required to be easily dyed by a simple dyeing method. In the case where, for example, a lens is dyed with gradation in color thickness such that an upper part of the lens is low in transparency and a lower part thereof is high in transparency, the lens is provided with a functionality of for example, being highly anti-glare when the wearer of the lens looks at a far place or the sky and of providing a bright image to improve the workability when the wearer looks at a place close to him/her hand.

However, aromatic polycarbonate resins represented by bisphenol A polycarbonate have a problem of being very difficult to be dyed by a general dyeing method (e.g., dyeing with a disperse dye, etc.). In order to dye such an aromatic polycarbonate resin, a troublesome process is required including, for example, providing a coat layer on the lens with a hard coat material that can be dyed, and dyeing the coat layer. Such a method using a hard coat material that can be dyed has problems that the scratch resistance of the hard coat material is not sufficiently high and that the cost is increased.

In order to solve these problems, a method for improving the ease of dyeing by using a polymer alloy obtained by blending aromatic polycarbonate formed of bisphenol A and a polycarbonate resin derived from an alicyclic dihydroxy compound is proposed (Patent Document 5).

Regarding the aromatic polycarbonate, it is recognized that the surface thereof is easy to be damaged, and it is indispensable to provide a hard coat layer as a measure to prevent the aromatic polycarbonate from being damaged. However, there is a problem that in the case where the dyed lens is provided with a hard coat layer, the dye is discolored in a washing step with an acid-alkali or alcohol material and also in a hard coat liquid application step. Patent Document 5 does not describe the discoloring or hard-coating. Patent Document 4 discloses a polarizing eyeglass lens using a PC alloy containing 1,4-cyclohexanedimethanol, and describes that a surface thereof may be optionally subjected to any of various known surface treatments including hard-coating, anti-fog coating, anti-reflection coating and the like and a dyeing process for coloring. However, Patent Document 4 does not include any specific description on a hard-coated dyed lens.

PRIOR ART DOCUMENTS

Patent Documents

Patent Document 1: Japanese Laid-Open Patent Publication No. H03-39903
Patent Document 2: Japanese Laid-Open Patent Publication No. H08-52817
Patent Document 3: Japanese Laid-Open Patent Publication No. H08-313701
Patent Document 4: Japanese Laid-Open Patent Publication No. 2010-39357
Patent Document 5: Japanese Laid-Open Patent Publication No. 2011-132422

SUMMARY OF THE INVENTION

Problems to be Solved by the Invention

The present invention has an object of providing a functional sheet that is easy to be dyed and prevents discoloring.

The present invention also has an object of providing a colored eyewear item that is obtained as a result of the functional sheet being hard-coated and thus has high scratch resistance.

Means for Solving the Problems

Based on the knowledge that use of a functional sheet formed of a specific material improves the ease of dyeing of a lens and also prevents discoloring, the present inventors have found that a colored lens having high scratch resistance is provided by dyeing a lens and providing a general hard coat layer on the lens, and completed the present invention.

Namely, the present invention is as follows.
<1> A functional sheet, comprising:
a functional layer provided between a protective layer I and a protective layer II, the functional layer being a polarizing film layer, a photochromic layer, or a combination of the polarizing film layer and the photochromic layer;
wherein at least one of the protective layer I and the protective layer II includes a layer formed of a resin (C) containing a polyester resin (A) obtained as a result of polycondensation of 1,4-cyclohexanedimethanol and 1,4-cyclohexanedicarboxylic acid and an aromatic polycarbonate resin (B), the polyester resin (A) being contained at a content of 10 to 100 parts by mass and the aromatic polycarbonate resin (B) being contained at a content of 0 to 90 parts by mass with respect to 100 parts by mass as a total of the polyester resin (A) and the aromatic polycarbonate resin (B).
<2> The functional sheet according to <1>, wherein the protective layer including the layer formed of the resin (C) includes the layer formed of the resin (C) and a layer formed of an aromatic polycarbonate resin, which are stacked to be integrated together, and the layer formed of the resin (C) is a front surface layer.
<3> A lens obtained as a result of the functional sheet according to <1> or <2> being bent to be spherical or aspherical.
<4> A lens obtained as a result of the functional sheet according to <1> or <2> being bent such that the layer formed of the resin (C) is at a convexed surface and then being inserted into a mold, and a transparent resin being injection-molded to be put on a concaved surface of the functional sheet and integrated with the functional sheet.
<5> A colored lens obtained as a result of the lens according to <3> or <4> being dyed.
<6> The lens according to any one of <3> to <5>, wherein the lens includes a hard coat.
<7> An eyewear item including the lens according to any one of <3> to <6>.

Advantageous Effect of the Invention

According to the present invention, the ease of dyeing of a lens is improved, and the discoloring of the lens is prevented. Therefore, a colored lens having high scratch resistance is provided by dyeing the lens and providing the lens with a general hard coat.

EMBODIMENTS FOR CARRYING OUT THE INVENTION

Hereinafter, the present invention will be described in detail.

A polyester resin (A) usable in the present invention is, for example, a polyester resin obtained by polycondensation, by esterification or transesterification, of 1,4-cyclohexanedimethanol and 1,4-cyclohexanedicarboxylic acid. An example of commercially available polyester resin is polyester-based thermoplastic elastomer "PRIMALLOY CP300" produced by Mitsubishi Chemical Corporation. The polyester resin (A) usable in the present invention is, more preferably, a poly(1,4-cyclohexanedimethanol-1,4-cyclohexanedicarboxylate) resin formed of 1,4-cyclohexanedimethanol and 1,4-cyclohexanedicarboxylic acid. Examples of commercially available polyester resin include polyester-based thermoplastic elastomers "PRIMALLOY CP200" and "PRIMALLOY CP201" produced by Mitsubishi Chemical Corporation.

An aromatic polycarbonate resin (B) usable in the present invention is a thermoplastic polycarbonate polymer that may be branched and is produced by reacting an aromatic dihydroxy compound, or the aromatic dihydroxy compound and a small amount of polyhydroxy compound, with phosgene or a diester of carbonic acid. The aromatic dihydroxy compound usable in the present invention is a compound represented by the following general formula (a) or the following general formula (b).

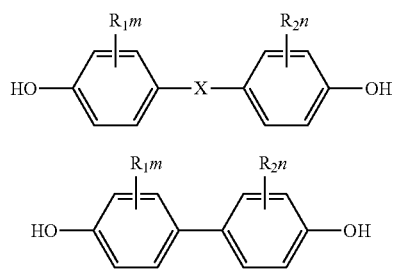

general formula (a)

general formula (b)

In the general formula (a) above,

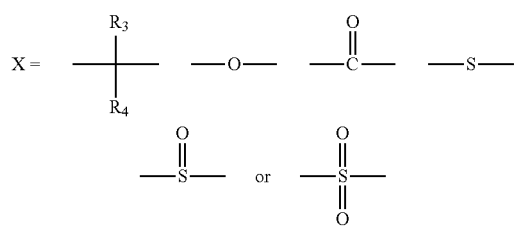

In general formula (a) and general formula (b), $R_1$ and $R_2$ are each a hydrogen atom or an alkyl group or halogen having a carbon number of 1 to 10. $R_1$ and $R_2$ may be the same as, or different from, each other. m and n represent the number of substituent(s) and are each an integer of 0 to 4.

Regarding "X" in general formula (a), $R_3$ and $R_4$ are each a hydrogen atom or an alkyl group or a phenyl group having a carbon number of 1 to 10. $R_3$ and $R_4$ may be bonded to form a ring.

Examples of the aromatic dihydroxy compound represented by the general formula (a) or the general formula (a) shown above include bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-3-methylphenyl)propane, 1,1-bis(4-hydroxy-3-tert-butylphenyl)propane, 2,2-bis(4-hydroxy-3- bromophenyl)propane, 1,1-bis(4-hydroxyphenyl)cyclopentane, 1,1-bis(4-hydroxyphenyl)cyclohexane, 4,4'-dihydroxydiphenylether, 4,4'-dihydroxy-3,3'-dimethylphenylether, 4,4'-dihydroxyphenylsulfide, 4,4'-dihydroxy-3,3'-dimethyldiphenylsulfide, 4,4'-dihydroxydiphenylsulfoxide, 4,4'-dihydroxy-3,3'-dimethyldiphenylsufoxide, 4,4'-dihydroxydiphenylsulfone, 4,4'-dihydroxydiphenylsulfone, 4,4'-dihydroxy-3,3'-dimethyldiphenylsulfone, and the like. Among these, 2,2-bis(4-hydroxyphenyl)propane (bisphenol A: BPA) is especially preferable from the point of view of strength, heat resistance, durability or bendability. Two or more aromatic dihydroxy compounds represented by general formula (a) may be combined. Such an aromatic polycarbonate resin (B) has a glass transition point of about 135 to about 155° C.

The aromatic polycarbonate resin (B) in the present invention may contain other component(s). There is no specific limitation on the other component(s). The other component(s) may be appropriately selected in accordance with the purpose thereof. Examples of the other component include an antioxidant, a releasing agent, an ultraviolet absorber, a fluidity modifier, a crystal nucleating agent, a reinforcing agent, a dye, an antistatic agent, an antibacterial agent and the like. These components may be used independently or as a mixture of two or more thereof.

Regarding the molecular weight of the aromatic polycarbonate resin (B), a viscosity average molecular weight of 12,000 to 40,000 is preferable from the point of view of moldability of the sheet, and a viscosity average molecular weight of 20,000 to 35,000 is especially preferable from the point of view of sheet strength, heat resistance durability or bendability.

A layer formed of a resin (C) in the present invention includes 10 to 100 parts by mass of the polyester resin (A), and 0 to 90 parts by mass of the aromatic polycarbonate resin (B), with respect to 100 parts by mass as a total of the polyester resin (A) and the aromatic polycarbonate resin (B). From the points of view of ease of dyeing and post-dyeing anti-discoloring property of the layer formed of the resin (C), it is preferable that the resin (C) contains 20 to 50 parts by mass of the polyester resin (A) and 50 to 80 parts by mass of the aromatic polycarbonate resin (B), and it is more preferable that the resin (C) includes 20 to 40 parts by mass of the polyester resin (A) and 60 to 80 parts by mass of the aromatic polycarbonate resin (B). From the point of view of heat resistance of the functional sheet, it is preferable that the aromatic polycarbonate resin (B) is contained at a content of 50 parts by mass or greater.

The layer formed of the resin (C) in the present invention may be produced as follows. A solid of the polyester resin (A) and a solid of the aromatic polycarbonate resin (B) that are produced independently may be mixed together and kneaded by a kneading device. Alternatively, a solid of the aromatic polycarbonate resin (B) may be incorporated into the polyester resin (A) in a melted state, or a solid of the polyester resin (A) may be incorporated into the aromatic polycarbonate resin (B) in a melted state, and then the resultant mixture may be kneaded by a kneading device. Still alternatively, the polyester resin (A) in a melted state and the aromatic polycarbonate resin (B) in a melted state may be mixed together and kneaded by a kneading device.

The kneading may be performed in a continuous method or a batch method. Examples of usable kneading device include an extruder, a labo plastomill, a kneader or the like. In the case where the kneading is performed in a continuous method, an extruder is preferably usable. In the case where the kneading is performed in a batch method, a labo plastomill or a kneader is preferably usable. In the case where a polycarbonate resin produced by melt polycondensation is used, it is desirable to perform the kneading before the catalyst is deactivated in order to avoid transesterification at the time of kneading.

According to another method for producing a layer formed of the resin (C) in the present invention, the polyester resin (A) and the aromatic polycarbonate resin (B) are dissolved in a solvent and injected into a cast, and then the solvent is vaporized. Examples of the usable solvent include methylene chloride, chloroform, cresol and the like. This method allows an additive to be melted and added at the same time as the production of the layer formed of the resin (C), and thus is convenient.

The layer formed of the resin (C) in the present invention may contain any of various other known components in accordance with the purpose thereof, in a range that does not spoil the properties of the resin (C). Preferable examples of the component that may be contained include a thermal stabilizer, a hydrolysis stabilizer, an antioxidant, a pigment, a dye, a reinforcing agent, a filler, an ultraviolet absorber, a lubricant, a releasing agent, a crystal nucleating agent, a plasticizer, a fluidity modifier, an antistatic agent, an antibacterial agent and the like.

Such an additive may be incorporated into either one of, or both of, the polyester resin (A) and the aromatic polycarbonate resin (B) before the blending and kneading, or may be incorporated at the time of the blending and kneading, or after the blending.

The layer formed of the resin (C) in the present invention may be produced by pelleting followed by injection molding, compression molding, extrusion molding or the like. Such a molding method may be a conventionally known method.

A functional sheet according to the present invention includes the layer formed of the resin (C) containing the polyester resin (A) and the aromatic polycarbonate resin (B) as at least a protective layer provided at one surface thereof. The protective layer has a thickness of, usually, 50 μm to 1.5 mm and, preferably, 100 μm to 800 μm. The protective layer in the present invention may be a single layer of the resin (C), and preferably a multi-layer sheet or film including the layer formed of the resin (C) and a layer of an aromatic polycarbonate resin stacked and integrated together. There is no specific limitation on the method of stacking. Coextrusion molding, which provides a high adherence to form the stack, is preferable. In the case where such a multi-layer sheet or film including a layer of an aromatic polycarbonate resin and the layer formed of the resin (C) stacked and integrated together is used, the protective layer has improved heat resistance and improved impact resistance. In this case, it is preferable that the protective layer is located with respect to a functional layer such that the layer formed of the resin (C) is located on a front side of the functional sheet and the layer formed of the aromatic polycarbonate resin is located on the side of the functional layer.

The aromatic polycarbonate has a high photoelastic constant and easily causes colored interference fringes based on the birefringence caused by stress or alignment. Therefore, it is preferable that a sheet or film including the layer formed of the resin (C) in the present invention is provided with a large value of retardation in advance so that the colored interference fringes are invisible. The retardation value is 2,000 nm or greater and 20,000 nm or less, preferably 3,000 nm or greater, and especially preferably 4,000 nm or greater in consideration of the reduction thereof in processing steps. As the retardation value is higher, the colored interference fringes are more invisible. However, the retardation value represents the degree of alignment or the magnitude of the residual stress. A higher value of retardation provides a disadvantage of decreasing the precision of the surface shape. The colored interference fringes are visible to the human eye only through a polarizing film. Therefore, the effect of a sheet having a high value of retardation is provided in a state where the sheet is located on the light incidence side of the polarizing film, namely, on the side opposite to the human eye with respect to the polarizing film.

It is preferable that a polarizing film layer (or a polarizing functional layer) in the present invention is formed of a poly(vinyl alcohol)-based resin film that is dyed with a dichroic organic dye and stretched. Example of usable poly(vinyl alcohol) include poly(vinyl alcohol) (PVA), poly (vinyl formal), which has trace amount of remaining acetic acid ester structure of PVA and is a PVA derivative or analog, poly(vinyl acetal), saponified ethylene-vinyl acetate copolymer, and the like. PVA is especially preferable. This film is stretched in one direction while being impregnated with a dichroic organic dye or having the dichroic organic dye adsorbed thereto and having the dichroic organic dye fixed optionally. Then, the resultant substance is dried to produce a polarizing film.

A usable PVA film has a weight average molecular weight of 50,000 to 350,000, and, preferably, 150,000 to 300,000. The film as the material of the PVA polarizing film has a thickness of, usually, about 100 to about 300 µm, and the PVA polarizing film has a thickness of, usually, 10 to 50 µm.

The PVA film is stretched to a magnification of twice to 8 times longer. The magnification is optionally selected in accordance with the purpose of the PVA polarizing film. From the point of view of post-rolling strength, it is preferable that the PVA film is stretched to a magnification of 3 to 5 times longer.

A photochromic layer in the present invention may be formed of, for example, (1) a photochromic film produced in advance or (2) a photochromic adhesive layer containing a photochromic organic compound. In the case of (1) is used, the photochromic film is a resin film having a photochromic organic compound dispersed therein uniformly, and may be produced by a known method such as casting, melt extrusion, thermal diffusion or the like.

The functional sheet according to the present invention is, for example, punched into the shape of an individual lens, and is bent such that the layer formed of the resin (C) is at a convexed surface of the functional sheet. In the case where the functional sheet is used as an injection-molded lens, the functional sheet, after being bent, is inserted into a mold, and a transparent resin is injection-molded to be put on a concaved surface of the functional sheet, so that the functional sheet and the transparent resin are integrated together. As a result, a lens is produced. Examples of the usable transparent resin include aromatic polycarbonate, amorphous polyolefin (alicyclic polyolefin), polyacrylate, polysulfone, acetylcellulose, polystyrene, polyester, transparent polyamide, a composition of aromatic polycarbonate and alicyclic polyester, a mixture thereof, and the like. For sunglasses and goggles, which are required to have high impact resistance and high heat resistance, aromatic polycarbonate is preferable. Among various types of aromatic polycarbonate resin, bisphenol A polycarbonate is more preferable.

The functional sheet, and the lens using the functional sheet, according to the present invention may be dyed. Any of various known dyeing methods is usable. According to a representative dyeing method, for example, dyeing is performed with a dye (e.g., disperse dye, etc.), a pigment or the like in an aqueous medium, in an organic solvent, or in a mixture of an aqueous medium and an organic solvent. A method of dyeing with a disperse dye in an aqueous medium is preferable. There is no specific limitation on the type of dye or pigment. Any of various dyes or pigments usable for dyeing fabrics, resins and the like is preferably usable.

Next, the resultant lens may be hard-coated. It is known that a surface of the resin is more easily damaged than glass. For sunglasses and goggles, it is strongly desired that a hard coat layer is stacked on the surface of the resin in order to improve the scratch resistance. The functional sheet according to the present invention is easily dyed. Therefore, the material of the hard coat layer or the hard-coating conditions is not restricted by whether the hard coat layer can be dyed or not. The material of the hard coat layer or the hard-coating conditions may be optionally selected from those having, or providing, high scratch resistance, good external appearance, and high adherence to the functional sheet or to an inorganic layer such as a mirror coat, an anti-reflection coat or the like provided after the hard coat layer. Examples of usable application method include known methods such as dipping, spraying, roll-coating, spin-coating and the like. A hard coat liquid is applied to a substrate by such a method and dried. Then, the resultant hard coat is optionally heated to form a cover layer. The hard coat liquid may be produced by dissolving or dispersing a hard coat composition in a solvent, and then diluting the resultant substance with a diluting solvent optionally. Examples of the usable diluting solvent include alcohols, cellosolves, ketones, esters, ethers and the like.

Usually, a pre-process is performed before the application of the hard coat liquid. Examples of the pre-process include degreasing of the surface with acid-alkali, ultrasonic washing, and the like. Such a pre-process removes stains that influence the adherence of the hard coat layer. Then, the pre-process solution is removed by alcohol or the like, the hard coat liquid is applied, and thus the hard coat layer is formed.

Next, the resultant lens is secured to a frame by edging, drilling, screw tightening and the like. As a result, an eyewear item (sunglasses, goggles, etc.) is produced.

EXAMPLES

Hereinafter, examples of the present invention will be described. The present invention is not limited to any of the following examples.

Example 1

<Production of a Protective Layer Sheet>

A protective layer sheet was produced with the polyester resin (A) (trade name: PRIMALLOY CP201 produced by Mitsubishi Chemical Corporation) by use of an extrusion device (PSV-30 produced by Plaengi Inc.) including a monoaxial extruder having a shaft diameter of 30 mm, a feed block coupled with the extruder and a T-die coupled with the feed block. The polyester resin (A) was continuously introduced into the monoaxial extruder having a shaft diameter of 30 mm and extruded under a condition of a cylinder temperature of 250° C. The polyester resin (A) was extruded into a sheet by the T-die coupled to a tip of the monoaxial extruder, and cooled while having a mirror surface transferred thereon by a mirror surface finishing roll. As a result, a sheet of the polyester resin (A) was obtained. The roll was set to a temperature of 100° C.

<Production of a Polarizing Film>

Poly(vinyl alcohol) (trade name: VF-PS #7500 produced by Kuraray Co., Ltd.) was stretched to twice as longer while being swollen in water at 35° C. for 270 seconds.

Then, the resultant poly(vinyl alcohol) was stretched to three times longer while being dyed in an aqueous solution containing Kayarus Supra Blue BWL, Sumilite Red 4B, Sumilite Supra Orange 2GL, and 10 g/L of anhydrous sodium sulfate at 35° C.

The resultant dyed film was stretched four times longer while being immersed in an aqueous solution containing 2.3 g/L of nickel acetate and 4.4 g/L of boric acid at 35° C. for 120 seconds. The resultant film was dried at room temperature for 3 minutes while being kept tensile. Then, the resultant film was heated at 110° C. for 3 minutes. As a result, a polarizing film having a transmittance of 35% and a degree of polarization of 99% was obtained.

<Production of a Functional Sheet>

An adhesive composition was prepared with 50 parts by mass of polyurethane prepolymer, 5 parts by mass of curing agent, and 60 parts by mass of ethyl acetate as a solvent. The adhesive composition was applied to the above-described polarizing film by use of a bar coater #24, and dried at 70° C. for 10 minutes. Then, a protective layer sheet produced above and the adhesive composition on the polarizing film were bonded together by a laminator. The adhesive composition was also applied to the side of the polarizing film of the resultant stacked sheet by substantially the same manner, and another protective layer sheet also produced above was bonded in substantially the same method. As a result, a functional sheet was obtained. The adhesive film had a post-curing thickness of 9 to 11 μm. The protective layer sheets each had a thickness of 0.3 mm.

<Bending>

A cut piece of the resultant functional sheet was bent by use of a concaved spherical surface bending form (radius of curvature: 66.81 mm; base curve: 7.932) provided with a vacuum-absorber and a silicone rubber sheet cover. Specifically, the cut piece of the functional sheet was put on a female silicone rubber sheet set to have a surface temperature of 145° C., and vacuum absorbing was started. Next, the cut piece of the functional sheet was pressurized, by a male form covered with a silicone rubber sheet, to be bent so as to have a spherical surface. Herein, the "base curve" is a curvature of a front surface of the lens, and is a value obtained by dividing 530 with a radius of curvature in units of millimeter.

<Formation of a Lens by Injection Molding>

The bent functional sheet was inserted into a mold for injection molding such that a convexed surface of the functional sheet would contact the mold. An aromatic polycarbonate resin (trade name: Iupilon CLS3400 produced by Mitsubishi Engineering-Plastics Corporation) was injection-molded to be put on a concaved surface of the functional sheet. As a result, a lens was produced. Regarding the conditions of the injection molding, the resin temperature was set to 300° C., the mold temperature was set to 80° C., and the pressure applied in a pressure keeping step was set to 60 MPa.

<Dyeing of the Lens>

88 ml of BPI Brown #31100 (produced by Brain Power Inc.) as a disperse dye was incorporated into 1 L of pure water, and kept at 93° C. As a result, a brown dyeing liquid was obtained. The above-described polarizing lens was immersed in the brown dyeing liquid at 93° C. As a result, a colored lens was obtained. The spectral transmittance of the colored lens was measured by a spectrometer (trade name: UV-2700 produced by Shimadzu Corporation), and the difference between the pre-dyeing transmittance and the post-dyeing transmittance (post-dyeing amount of dye) was evaluated. Herein, the "transmittance" is the luminous transmittance in a two-degree field using a C light source, which is defined by JIS Z-8701.

<Discoloring with Alcohol>

The colored lens produced above was immersed in methanol for 30 minutes to evaluate the difference between the pre-dyeing transmittance and the post-discoloring transmittance (post-discoloring amount of dye). Then, the discoloring rates before and after the immersion were evaluated. Herein, the "discoloring rate" is defined as a value calculated by the expression "(post-dyeing amount of dye−post-discoloring amount of dye)/(post-dyeing amount of dye)×100". The transmittance was measured by substantially the same method as that of, by use of the device used for, the evaluation on the coloring.

<Hard Coating>

The above-described colored lens was hard-coated by a dip coater. As a result, a hard-coated colored lens was obtained.

The values of the transmittance and the amount of dye before and after the dyeing, the transmittance and the amount of dye after the discoloring, and the discoloring rate are shown in Table 1 below.

Example 2

A colored lens was produced in substantially the same manner as in example 1 except that 40 parts by mass of the polyester resin (A), and 60 parts by mass of the aromatic polycarbonate resin (B) (trade name: Iupilon E-2000 produced by Mitsubishi Engineering-Plastics Corporation (same in the following examples), with respect to 100 parts by mass as a total of the polyester resin (A) and the aromatic polycarbonate resin (B), were mixed to form a protective layer sheet. Substantially the same evaluations as in example 1 were performed. The evaluation results are shown in Table 1.

Example 3

A colored lens was produced in substantially the manner as in example 1 except that 30 parts by mass of the polyester resin (A), and 70 parts by mass of the aromatic polycarbonate resin (B), with respect to 100 parts by mass as a total of the polyester resin (A) and the aromatic polycarbonate resin (B), were mixed to form a protective layer sheet. Substantially the same evaluations as in example 1 were performed. The evaluation results are shown in Table 1.

Example 4

A colored lens was produced in substantially the same manner as in example 1 except that 20 parts by mass of the polyester resin (A), and 80 parts by mass of the aromatic polycarbonate resin (B), with respect to 100 parts by mass as a total of the polyester resin (A) and the aromatic polycarbonate resin (B), were mixed to form a protective layer sheet. Substantially the same evaluations as in example 1 were performed. The evaluation results are shown in Table 1.

Example 5

A colored lens was produced in substantially the same manner as in example 1 except that 10 parts by mass of the polyester resin (A), and 90 parts by mass of the aromatic polycarbonate resin (B), with respect to 100 parts by mass as a total of the polyester resin (A) and the aromatic polycarbonate resin (B), were mixed to form a protective layer sheet. Substantially the same evaluations as in example 1 were performed. The evaluation results are shown in Table 1.

Example 6

A colored lens was produced in substantially the same manner as in example 1 except that a stacked body formed of the polyester resin (A) and the aromatic polycarbonate resin (B) produced by coextrusion was used as the protective layer sheet and that a functional sheet was produced by stacking the protective layer sheet and the adhesive composition applied to the polarizing film such that the aromatic polycarbonate resin layer of the protective layer sheet would be bonded with the adhesive composition. Substantially the same evaluations as in example 1 were performed. The evaluation results are shown in Table 1.

Example 7

A colored lens was produced in substantially the same manner as in example 5 except that the protective layer sheet was set to have a thickness of 0.7 mm and that injection molding was not used to produce the lens. Substantially the same evaluations as in example 5 were performed. The evaluation results are shown in Table 1.

Comparative Example 1

A colored lens was produced in substantially the same manner as in example 1 except that the aromatic polycarbonate resin (B) was used instead of the polyester resin (A) to produce a protective layer sheet. Substantially the same evaluations as in example 5 were performed. The evaluation results are shown in Table 1.

TABLE 1

|  | Example 1 | Example 2 | Example 3 | Example 4 | Example 5 | Example 6 | Example 7 | Comparative example 1 |
|---|---|---|---|---|---|---|---|---|
| Polyester resin (A) (parts by mass) | 100 | 40 | 30 | 20 | 10 | 100 | 10 | 0 |
| Polycarbonate resin (B) (parts by mass) | 0 | 60 | 70 | 80 | 90 | 0 | 90 | 100 |
| Pre-dyeing transmittance (%) | 33.5 | 32.9 | 34.6 | 33.0 | 33.5 | 34.0 | 35.2 | 34.0 |
| Post-dyeing transmittance (%) | 3.0 | 4.2 | 5.6 | 16.5 | 27.8 | 3.1 | 0.5 | 30.4 |
| Post-discoloring transmittance (%) | 4.1 | 5.2 | 6.8 | 18.5 | 29.5 | 4.1 | 0.8 | 33.2 |
| Post-dyeing amount of dye | 30 | 29 | 29 | 16 | 5.7 | 31 | 35 | 3.7 |
| Post-discoloring amount of dye | 29 | 28 | 28 | 14 | 4.0 | 30 | 34 | 0.9 |
| Discoloring ratio (%) | 3.4 | 3.5 | 3.4 | 12 | 30 | 3.2 | 2.9 | 76 |

As shown in Table 1, in example 1, the post-dyeing transmittance is lower than the pre-dyeing transmittance by 30% or greater, which is preferable. In addition, the discoloring rate is close to 3%, which is also preferable. The scratch resistance is good because of the hard coating. In the present invention, the post-dyeing transmittance is lower than the pre-dyeing transmittance by, preferably 5% or greater, more preferably, 15% or greater, and especially preferably, 25% or greater. In the present invention, the discoloring rate is preferably 30% or less, more preferably 10% or less, and especially preferably 5% or less. By contrast, in comparative example 1, the post-dyeing transmittance is lower than the pre-dyeing transmittance only by 3.7%, and the discoloring rate is 76%, which is very high.

The invention claimed is:

1. A lens in which a functional sheet is bent to be spherical or aspherical, said functional sheet comprising:
    a functional layer provided between a protective layer I and a protective layer II, the functional layer being a polarizing film layer, a photochromic layer, or a combination of the polarizing film layer and the photochromic layer;
    wherein the protective layer I and the protective layer II each includes a layer consisting of a resin (C) consisting of (i) a polyester resin (A) obtained as a result of polycondensation of 1,4-cyclohexanedimethanol and 1,4-cyclohexanedicarboxylic acid and (ii) an aromatic polycarbonate resin (B) and (iii) optionally at least one additive selected from the group consisting of a thermal stabilizer, a hydrolysis stabilizer, an antioxidant, a pigment, a dye, a reinforcing agent, a filler, an ultraviolet absorber, a lubricant, a releasing agent, a crystal nucleating agent, a plasticizer, a fluidity modifier, an antistatic agent, and an antibacterial agent, the polyester resin (A) being contained at a content of 20 to 40 parts by mass and the aromatic polycarbonate resin (B) being contained at a content of 60 to 80 parts by mass with respect to 100 parts by mass as a total of the polyester resin (A) and the aromatic polycarbonate resin (B),
    wherein each of the protective layer I and the protective layer II has a thickness of 100 μm to 800 μm and combined total thickness of the protective layer I and the protective layer II is 200 μm to 1600 μm.

2. The lens according to claim 1, wherein the functional sheet and a layer forming an aromatic polycarbonate resin is stacked to be integrated together, and wherein the functional sheet is a front surface layer.

3. The lens according to claim 1, wherein the functional sheet is bent at a convexed surface, and a transparent resin is injection-molded to be put on a concaved surface of the functional sheet and integrated with the functional sheet.

4. A colored lens obtained as a result of the lens according to claim 1 being dyed.

5. The lens according to claim 1, wherein the lens includes a hard coat.

6. An eyewear item including the lens according to claim 1.

* * * * *